United States Patent
Larmo et al.

(10) Patent No.: US 10,568,117 B2
(45) Date of Patent: Feb. 18, 2020

(54) METHODS AND APPARATUSES FOR OPERATING A WIRELESS SYSTEM WITH DEVICES IN POWER SAVE MODE USING TRAFFIC INDICATION MAP BEACONS

(71) Applicant: Telefonaktiebolaget LM Ericsson (publ), Stockholm (SE)

(72) Inventors: Anna Larmo, Espoo (FI); Parth Amin, St Albans (GB); Behnam Badihi, Kirkkonummi (FI); Luis Felipe Del Carpio Vega, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/738,984

(22) PCT Filed: Jul. 6, 2015

(86) PCT No.: PCT/SE2015/050799
§ 371 (c)(1),
(2) Date: Dec. 21, 2017

(87) PCT Pub. No.: WO2017/007384
PCT Pub. Date: Jan. 12, 2017

(65) Prior Publication Data
US 2018/0184445 A1    Jun. 28, 2018

(51) Int. Cl.
*H04W 72/12*    (2009.01)
*H04W 52/02*    (2009.01)
(Continued)

(52) U.S. Cl.
CPC ... *H04W 72/1252* (2013.01); *H04W 52/0216* (2013.01); *H04W 74/006* (2013.01);
(Continued)

(58) Field of Classification Search
CPC ......... H04W 72/1252; H04W 52/0216; H04W 74/006; H04W 84/12; Y02D 70/26;
(Continued)

(56) References Cited

U.S. PATENT DOCUMENTS

2013/0121221 A1    5/2013  HomChaudhuri et al.
2015/0223169 A1*   8/2015  Ghosh ............... H04W 52/0216
                                                            370/311
(Continued)

FOREIGN PATENT DOCUMENTS

WO    2014074070 A1    5/2014

OTHER PUBLICATIONS

Adame, T. et al., "Capacity Analysis of IEEE 802.11ah WLANs for M2M Communications", Oct. 25, 2013, 1-17.
(Continued)

*Primary Examiner* — Thai Nguyen
(74) *Attorney, Agent, or Firm* — Patent Portfolio Builders, PLLC

(57) ABSTRACT

There is disclosed a method for scheduling Traffic Indication Map beacons (101, 102), in a radio network node (70) of a communication network (100). The method comprises determining a traffic load of the radio network node and scheduling, based on the determined traffic load, at least a first transmission time instance for a first TIM beacon of said TIM beacons and a second transmission time instance for a second TIM beacon of said TIM beacons.

12 Claims, 10 Drawing Sheets

(51) Int. Cl.
*H04W 74/00* (2009.01)
*H04W 84/12* (2009.01)

(52) U.S. Cl.
CPC ......... *H04W 84/12* (2013.01); *Y02D 70/1262* (2018.01); *Y02D 70/1264* (2018.01); *Y02D 70/142* (2018.01); *Y02D 70/146* (2018.01); *Y02D 70/26* (2018.01)

(58) Field of Classification Search
CPC ............. Y02D 70/146; Y02D 70/1264; Y02D 70/142; Y02D 70/1262
See application file for complete search history.

(56) References Cited

U.S. PATENT DOCUMENTS

2015/0312753 A1* 10/2015 Asterjadhi ............... H04W 4/06
370/329
2015/0359008 A1* 12/2015 Wang .................. H04W 74/004
370/330
2017/0188302 A1* 6/2017 Qi ......................... H04W 56/00

OTHER PUBLICATIONS

Unknown, Author, "Part 11: Wireless LAN Medium Access Control (MAC) and Physical Layer (PHY) Specifications", IEEE P802.11-REVmc™/D4.0, Jan. 2015, 1-3730.

Unknown, Author, "Part 11: Wireless LAN Medium Access Control (MAC) and Physical Layer (PHY) Specifications", IEEE P802.11ah™/D5.0, Mar. 2015, 1-632.

European Office Action issued in corresponding EP Application No. 15747250.7; dated Feb. 19, 2019; 08 pages. All references cited therein have been previously made of record.

* cited by examiner determining a traffic load of the radio network node (70) / 42 scheduling, based on the determined traffic load, at least a first transmission time instance for a first TIM beacon (101, 102) of said TIM beacons and a second transmission time instance for a second TIM beacon (101, 102) of said TIM beacons / 44

Fig. 8 receiving (52), from a radio network node, a first Traffic Indication Map beacon, TIM beacon (101, 102) comprising a first group identity and a bit corresponding to a first Association Identifier, AID / 52 transmitting (54), in response to the received first TIM beacon (101, 102), a control frame to the radio network node (70), indicating that the wireless device (90) is available to receive data / 54 receiving (56), from the radio network node (70), a second TIM beacon (102) comprising the first- or a second group identity and a bit corresponding to a second AID / 56 transmitting (58), in response to the received second TIM beacon (102), a control frame to the radio network node (70), indicating that the wireless device (90) is available to receive data / 58

Fig. 9

METHODS AND APPARATUSES FOR OPERATING A WIRELESS SYSTEM WITH DEVICES IN POWER SAVE MODE USING TRAFFIC INDICATION MAP BEACONS

TECHNICAL FIELD

Embodiments herein relate to telecommunications in general and in particular to methods and apparatuses for operating Traffic Indication Map beacons (TIM beacons) for reducing latency in a radio communication network.

BACKGROUND

With the emergence of wireless communications, a plurality of wireless protocols such as Wireless Fidelity (WIFI), Session Initiation Protocol (SIP), Worldwide Interoperability for Microwave Access (WiMAX), etc. have emerged. Utilization of one or more of the wireless protocols has provided users with the ability to communicate with other users, computers, etc. without the constraints of a wired connection. To further facilitate mobility, many communications devices also utilize wireless power sources, such as e.g. batteries. As many of these wireless communications devices utilize battery power, conserving power to extend battery life has emerged as a priority.

As such, many communication devices are configured to enter a power save mode, during which, the communication devices may shut down one or more components, thereby conserving power. While utilization of this power save mode may provide power conservation, problems may arise in determining when the communication device should resume normal operation and/or when the communication device should enter the power save mode.

A problem arises for delay sensitive type of traffic, such as e.g. voice. In such a scenario, there is a risk that either the communication device is forced to resume normal operation too early, in order to satisfy latency requirements at the expense of power conservation efficiency, or that the (data or voice) traffic does not fulfill its latency requirements.

Thus, a heretofore unaddressed need exists in the industry to address the aforementioned deficiencies and inadequacies.

SUMMARY

It is an object of embodiments described herein to address at least some of the problems and issues outlined above. It is possible to achieve this object and others by using methods and a network node and a wireless device, as defined in the attached independent claims.

According to one aspect, a method is performed by a network node, in a communication network, for scheduling Traffic Indication Map beacons. The method comprises determining a traffic load of the radio network node and scheduling, based on the determined traffic load, at least a first transmission time instance for a first TIM beacon of said TIM beacons and a second transmission time instance for a second TIM beacon of said TIM beacons.

According to another aspect, a network node is arranged to schedule Traffic Indication Map beacons, TIM beacons. The radio network node comprises a processor and a memory, wherein the memory comprises instructions executable by the processor whereby the network node is operative to and/or adapted to determine a traffic load of the radio network node and schedule, based on the determined traffic load, at least a first transmission time instance for a first TIM beacon of said TIM beacons and a second transmission time instance for a second TIM beacon of said TIM beacons.

According to another aspect, a method is performed by a wireless device in a communication network, the method is performed between receiving two consecutive full Traffic Indication Map beacons, the method comprises receiving from a radio network node, a first Traffic Indication Map beacon comprising a first group identity and a bit corresponding to a first Association Identifier, AID; transmitting, in response to the received first TIM beacon, a control frame to the radio network node, indicating that the wireless device is available to receive data; receiving, from the radio network node, a second TIM beacon comprising the first- or a second group identity and a bit corresponding to a second AID and transmitting, in response to the received second TIM beacon, a control frame to the radio network node, indicating that the wireless device is available to receive data.

According to another aspect, a wireless device, comprising a processor and a memory, wherein the memory comprises instructions executable by the processor whereby the wireless device is operative to and/or adapted to, between receiving two consecutive full Traffic Indication Map beacons, full TIM beacons: receive, from a radio network node, a first Traffic Indication Map beacon, TIM beacon comprising a first group identity and a bit corresponding to a first Association Identifier, AID; transmit, in response to the received first TIM beacon, a control frame to the radio network node, indicating that the wireless device is available to receive data; receive, from the radio network node, a second TIM beacon comprising the first- or a second group identity and a bit corresponding to a second AID and transmit, in response to the received second TIM beacon, a control frame to the radio network node, indicating that the wireless device is available to receive data.

According to another aspect, a method is performed by a wireless device in a communication network, the method is performed between receiving two consecutive full Traffic Indication Map beacons, full TIM beacons, and the method comprises: receiving, from a radio network node, a first short Traffic Indication Map beacon, short TIM beacon, comprising a first group identity and a time offset indicating the transmission time instance of a second short TIM beacon comprising the first group identity, and receiving, from a radio network node, at the transmission time instance indicated by the time offset, the second short TIM beacon comprising the first group identity.

According to another aspect, a wireless device comprising a processor and a memory, wherein the memory comprises instructions executable by the processor whereby the wireless device is operative to and/or adapted to, between receiving two consecutive full Traffic Indication Map beacons, full TIM beacons: receive, from a radio network node, a first short Traffic Indication Map beacon, short TIM beacon, comprising a first group identity and a time offset indicating the transmission time instance of a second short TIM beacon comprising the first group identity, and receive, from a radio network node, at the transmission time instance indicated by the time offset, the second short TIM beacon comprising the first group identity.

The above network node, wireless device and methods therein may be implemented and configured according to different optional embodiments to accomplish further features and benefits, to be described below.

Some of the advantages achieved by the methods and the corresponding radio network node and wireless devices may be compiled as supporting:

Enablement of dynamic and asymmetric service capacity allocation to the wireless devices in different TIM groups, based on the traffic load in order to fulfill e.g. latency requirements on traffic for the wireless devices in different TIM groups.

Optimization of a trade-off between fulfilling latency requirements and saving battery in the wireless devices.

Dynamical, based on traffic load in the radio network node, adaption of the service periods for different TIM groups, to facilitate the fulfillment of latency requirements without adversely affecting the battery consumption of the wireless devices.

BRIEF DESCRIPTION OF DRAWINGS

The solution will now be described in more detail by means of exemplary embodiments and with reference to the accompanying drawings, in which:

FIG. 8 illustrates a method performed in a radio network node according to embodiments herein.

FIG. 9 illustrates a method performed in a wireless device according to embodiments herein.

DETAILED DESCRIPTION

The communication network wherein the embodiments herein are applied may use access technologies supporting power save functionality in mobile terminals. Examples of such networks or systems are OFDM-based systems e.g. Long Term Evolution, LTE-Advanced, Worldwide Interoperability for Microwave Access (WiMax) or WiFi (IEEE802.11 or WLAN). Although the terminology from IEEE802.11 is used in this disclosure to exemplify the different embodiments, this should not be seen as limiting the scope of the embodiments to only the aforementioned system. In the following, terminology is used referring to apparatuses such as mobile terminal, mobile station, STA (STAtion), user equipment (UEs), wireless device, and a radio network node. By a radio network node is meant a radio base station; an AP (access point (AP), an eNodeB, an base station or any suitable radio network node capable is serving a cell and mobile terminals e.g. UEs, STAs, or wireless devices.

Briefly described, a solution is provided to ensure that wireless devices are able to stay or remain in power save mode as much as possible while the wireless communication network still fulfills requirements on e.g. latency related to certain traffic.

The solution is defined by the appended claims.

Figures 12, 13:
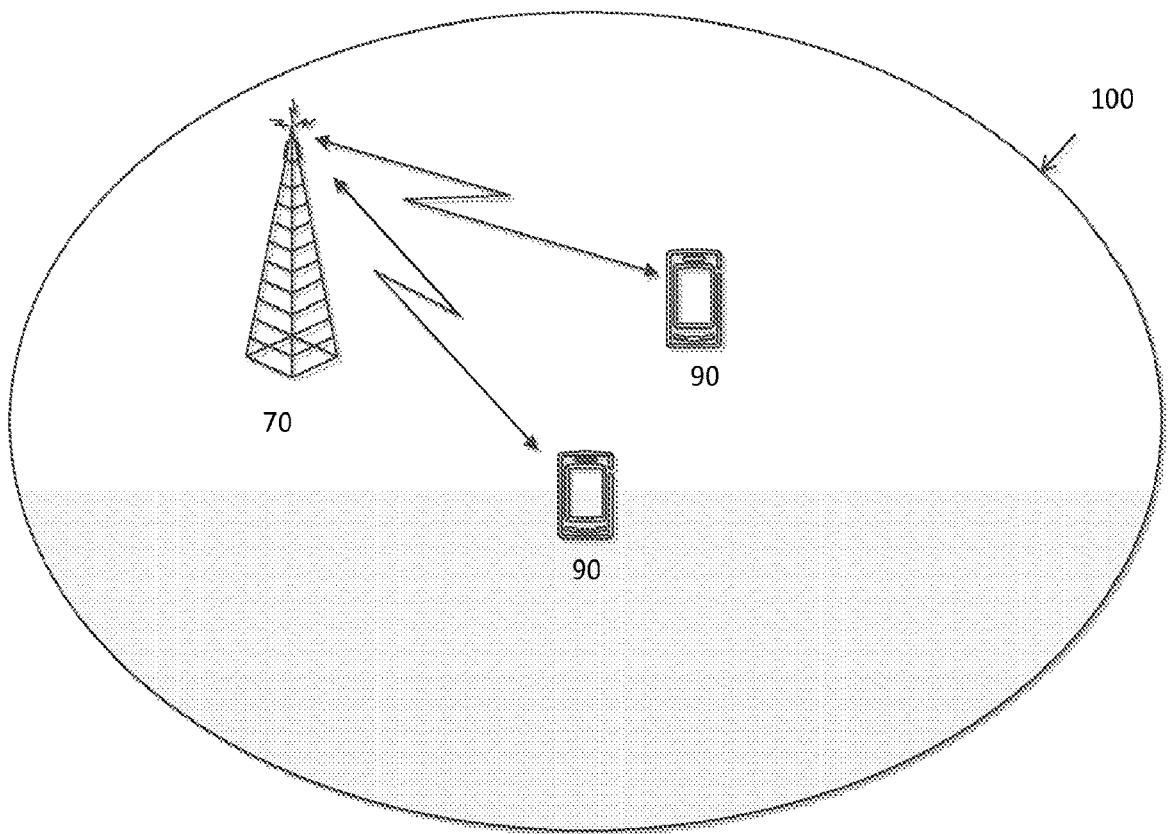
FIG. 12 illustrates an exemplary communication network in which embodiments herein may be applied and/or implemented.
FIG. 13 illustrates a method performed in a wireless device according to embodiments herein.

Referring to FIG. 12 there is illustrated a communication network 100 wherein embodiments herein may be employed or applied. Two wireless devices are shown and denoted 90. A radio network node 70 is also shown.

IEEE802.11 is a standard specifying wireless local area networks (WLAN), also known as WiFi. The IEEE802.11 WLAN system uses Industrial Scientific and Medical (ISM) frequency bands to access the wireless medium via contention based protocols complying with different regulatory domains.

IEEE802.11ah is an additional feature to the IEEE802.11 standard. This additional feature is a new PHY and MAC design that operates in the sub-one-gigahertz (900 MHz) band. The 802.11ah is intended to support extended range Wi-Fi, and the Internet-of-everything (IoE). The 11ah PHY and MAC are optimized from the ground up for extended range, power efficiency, and scalable operation One key element in the IEEE802.11ah, is that in the medium access control (MAC) protocol, there is a Traffic Indication Map (TIM) defined. The TIM enables the use of power save (PS) mode for STAs (stations) in a WiFi- or IEEE802.11 based system.

Referring back to FIG. 1, the wireless device 90 listens to the radio network node 70 for beacons carrying TIM. Such a beacon carrying TIM is hereinafter called a TIM beacon 101, 102.

A TIM beacon may contain indications that there is downlink (DL) data available for a certain wireless device during a time period after the TIM beacon is transmitted. Before the radio network node 70 transmits a TIM beacon 101, 102, the radio network node 70 may assemble a buffer status for each wireless device 90 that is in power save mode. Based on the assembled buffer status, the radio network node 70 may send an indication in the TIM field of the TIM beacon frame. This is described in more details in the in the standard specification of IEEE802.11, e.g. in sections 10.2.1.6.

When the wireless device 90 receives the indication, the wireless device 90 responds or acknowledges to the radio network node 70 by transmitting a control frame 105, e.g. a PS-Poll frame (Power Save-Poll), to indicate to the radio network node 70 that the wireless device 90 is available to receive data in the downlink (DL).

It should be mentioned that the wireless device 90 may operate in active mode, power save mode and automatic power save delivery mode (APSD) as described in the above mentioned IEEE802.11 standard specifications in sections 10.2.1.9, 10.2.1.10 and 10.2.1.11 respectively. In this application "power save mode" also covers "automatic power save mode".

Wireless devices 90 operating in active mode have their receiver activated continuously; and hence such wireless devices 90 do not need to interpret the TIM elements in the TIM beacon frame, and the radio network node 70 therefore is not required to buffer data addressed for wireless devices 90 being in active mode as described in the above mentioned IEEE802.11 standard specifications in sections 10.2.1.6 and 10.2.1.11.

In the TIM beacon, the radio network node 70 transmits information to a specific wireless device 90 being in power save mode informing the wireless device 90 that there is data in the radio network node buffer, which is addressed for that specific wireless device 90. One example on how to do perform this is that the radio network node 70 may transmit one single bit, in a bitmap, corresponding to an Association IDentifier (AID) associated with the wireless device 90. The association between the wireless device 90 and the AID may have been signaled to the wireless device 90 from the radio network node 70 and/or may have been preconfigured in the wireless device 90.

Figure 7A:
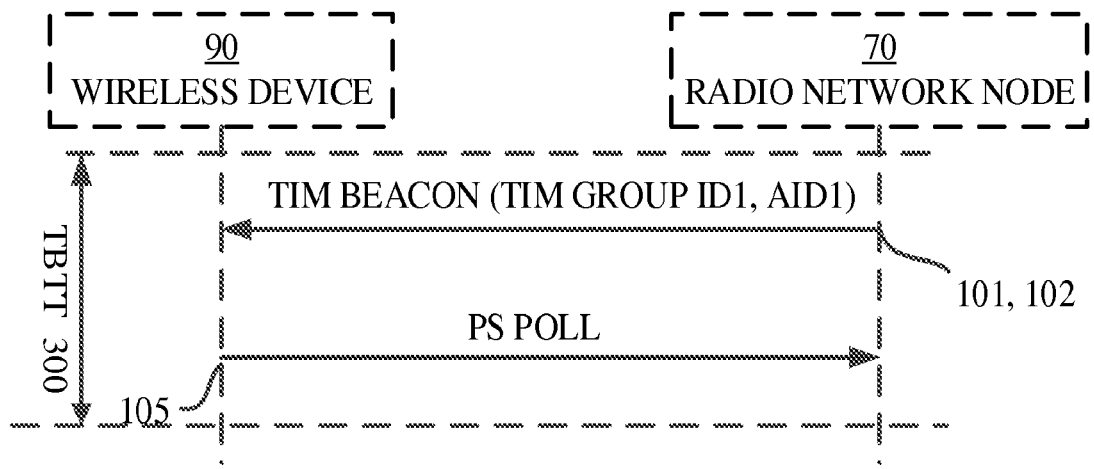
FIG. 7a illustrates an example of how a wireless device responds once within TBTT, when detecting that a bit corresponding to its AID is set.

If the wireless device 90 operating in power save mode detects that the bit corresponding to its AID is set, the wireless device 90 responds or acknowledges by transmitting, as previously described, a control frame 105 (e.g. a PS-Poll) to the radio network node 70 to indicate that it is available to receive the buffered data in the radio network node 70. This is illustrated in FIG. 7a.

Figure 1:
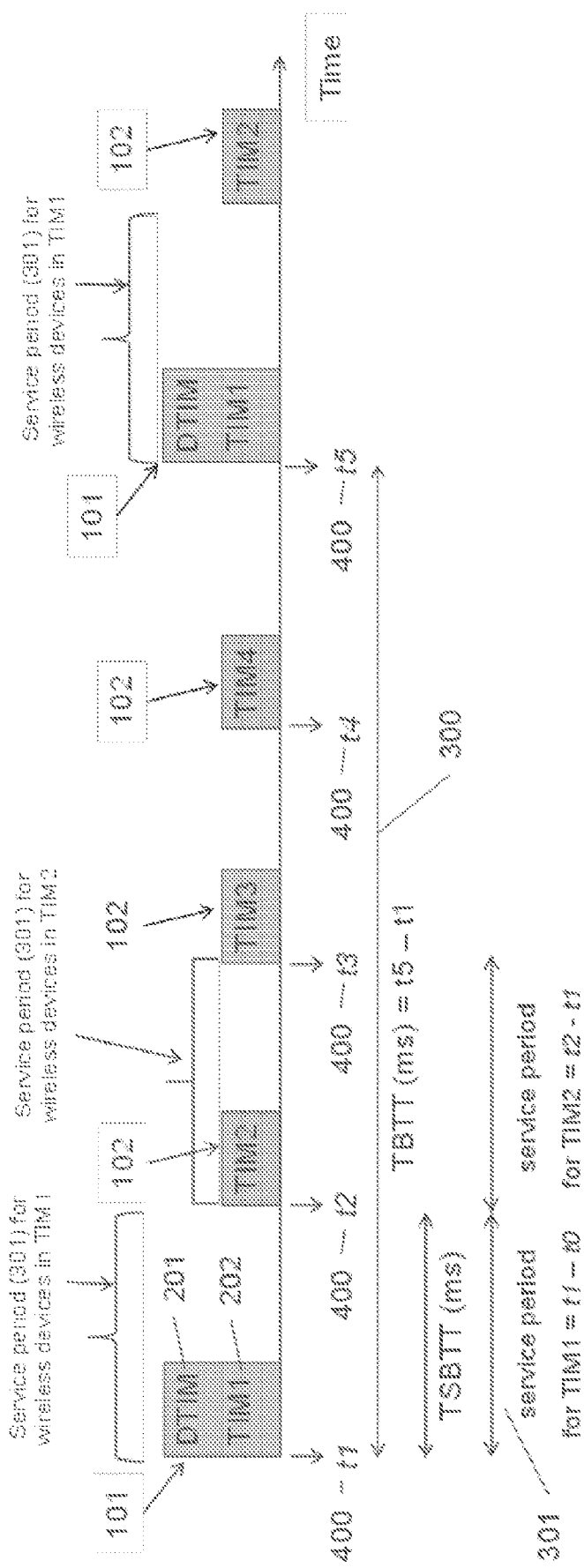
FIG. 1 illustrates an example of beacon transmissions based on 802.11ah standard draft.

The Traffic Indication Map concept comprises a Delivery TIM (DTIM) beacon 101, and a TIM beacon 102, per TIM group as depicted in FIG. 1. A TIM beacon comprising the DTIM information 201 may also be referred to as a full TIM beacon 101. A TIM beacon per TIM group, not comprising DTIM information 201, may be referred to as a short TIM beacon 102. In this disclosure, when referring to either a full- or short TIM beacon, TIM beacon 101, 102 is used.

The DTIM information 201 is sent out periodically, as a part of a full TIM beacon 101, along with TIM information 202 for the first TIM group (TIM1). TIM information relating to the TIM groups is part of the short TIM beacons, 102, transmitted every TSBTT (Target Short Beacon Transmission Time) intervals. The TSBTT interval may be the time period from the transmission time instance 400 of a short TIM beacon 102 until transmission of the consecutive short TIM beacon 102 as depicted in FIG. 1. The TSBTT intervals may be distributed evenly throughout the TBTT 300 (Target Beacon Transmission Time) period. The TBTT 300 period or interval, may be defined as the time period from the transmission time instance 400 of a full TIM beacon 101 until the transmission of consecutive full TIM beacon 101 as depicted in FIG. 1. The TIM information 202 for the first TIM group (TIM1) may be sent together with the DTIM information 201 in the full TIM beacon 101.

DTIM information 201, may comprise TBTT 300 indicating when the next full TIM beacon will be transmitted and number of TIM groups served within the TBTT 300

TIM information 202 may comprise a group identity indicating which TIM group the TIM beacon relates to, a time instance 400 indicating when the next TIM beacon comprising a group identity different from the current group identity will be transmitted, e.g. TSBTT and one or more Association identifiers (AIDs) as described above. The number of AIDs may e.g. depend on the number of wireless devices in the TIM group indicated by the TIM group identity.

A TIM group is a set of wireless devices 90 in power save mode which are supposed to wake up from doze- or sleep- or power save mode to listen for short TIM beacons 102 comprising TIM information 202 with a certain TIM group identity. One purpose of listening for the short TIM beacon 102 is for the wireless device 90 to determine if there is any DL data buffered in the radio network node 70, for the wireless device 90. E.g. wireless devices in TIM group 1 (TIM1) are supposed to listen to the TIM beacon containing. If, e.g. a wireless device 90, in TIM1 detects a bit, corresponding to its own AID, the wireless device 90 responds with a PS-Poll 105 to the radio network node 70, to indicate that it is available to receive data. Based on the PS-Poll 105, the radio network node 70, sends DL data to the wireless device 90, before transmitting the consecutive TIM beacon. The time period between the time instances 400 the radio network node 70 transmitted the TIM beacon until the time instance 400 the radio network node 70 transmits the consecutive TIM beacon, is called the service period 301, for the TIM group associated with the TIM group identity in the TIM information 202, of the first TIM beacon. In FIG. 1, the service period 301 for wireless devices belonging to TIM group 1 (TIM1) may be represented by the time period between time instance $t_1$ and time instance $t_2$.

A wireless device 90, belongs to a TIM group if it is associated with group identity indicating the TIM group. By associated with a group identity is meant that the wireless device 90, has acquired a group identity indicating a TIM group. The group identity may be acquired by receiving a configuration message, comprising the group identity, from the radio network node 70 and/or by receiving the group identity from another wireless device 90 and/or by being preconfigured in the wireless device 90.

In FIG. 1, an example of TIM beacon 101, 102 transmissions comprising DTIM information 201 and TIM information 202 elements is illustrated.

At time instance t1, the radio network node 70 transmits a full TIM beacon 101. The radio network node 70 transmits a full TIM beacon 101 every Target Beacon Transmission Times (TBTTs) as depicted in FIG. 1. The TBTT 300 is represented by the time period between time instance t1 and time instance t5. The TBTT 300 may have a time period between roughly 1 ms and 67 seconds. The radio network node 70, also transmits short TIM beacons 102. A short TIM beacon 102 includes only a minimal set of information elements, which thereby significantly reduces the length of the beacon frame in order to reduce waste resource utilization. The short TIM beacons, 102, are transmitted by the radio network node with a periodicity of Target Short Beacon Transmit Times (TSBTTs). An example of TSBTT in FIG. 1 is represented by the time period between e.g. time instance t1 and time instance t2 or by the time between time instance t2 and time instance t3. The TSBTT associated with a TIM group may correspond the service period 301 of that TIM group. The TSBTT and/or service period 301 is associated to a TIM group if the TIM group identity is transmitted in the TIM beacon at the beginning of the TSBTT or service period 301.

The time length of the service period 301 is proportional to the amount of wireless devices, 90, and/or the amount of data for the associated TIM group. In other words, the service period 301 corresponds to the service capacity of the associated TIM group E.g. if some of the wireless devices 90 in TIM group 1 (TIM1) in FIG. 1, are not served during the associated service period, these wireless devices 90, will have to wait for the next TIM beacon comprising the group identity associated with these wireless devices 90, before they can transmit a PS-Poll 105 again and probably get served in that coming service period 301. In essence, a wireless device 90 may need to transmit PS-Poll 105 several times to get the DL data indicated by the radio network node 70.

As an example, any use case where latency requirements for DL are strict and the number of wireless devices 90 is high, may cause problems to ensure that latency requirements are fulfilled.

An example will be used to illustrate one scenario in which a radio network node 70 delivers delay sensitive DL data to wireless devices 90 which may be in power save mode. By the DL data being delay sensitive is meant that there are latency requirements for DL. In this example the latency requirements will not be fulfilled. This example is provided only to make it easier to understand some problems that may arise.

In this example there is a light switching system with a light switch connected to a chandelier via a radio network node 70. The chandelier comprises e.g. 15 luminaires in one room and e.g. 5 other luminaires in another room. The light switch is connected to the luminaires via a WLAN communication network and the light switch and the luminaires correspond in this exemplary scenario, to the wireless devices 90. The light switch may be connected to the radio network node 70 via a wired connection and/or via a wireless connection. For the sake of simplicity, the delay between the light switch and the radio network node is negligible.

When one switches ON or OFF the light, one expects the light to change state, i.e. the luminaires to turn on or turn off almost instantaneously, normally in the order of milliseconds (ms). In this example it is assumed that the delay does not exceed 200 ms in order for one to experience a reasonable delay. This means that by pressing the light switch, delay sensitive DL traffic is generated for the luminaires (wireless devices 90). This DL traffic, i.e. the information about the luminaires to turn on or turn off, is transferred from the light switch to the luminaires (wireless devices 90) via the radio network node 70 within 200 ms.

In this example, two TIM groups are assumed. The 15 luminaires (wireless devices 90) in one of the rooms are associated with TIM group 1. The remaining five luminaires, of the other room, are associated with TIM group 2. In this example it is also assumed a service period 301 or TSBTT of 100 ms and a TBTT 300 of 200 ms. A further assumption is that it takes the radio network node about 10 ms to serve each luminaire (wireless device 90) with DL data.

Considering a scenario when a person in a home wants to turn on the chandelier by pressing the light switch, the command from the light switch should be received by all of the 15 luminaires within 200 ms from pressing the light switch.

The above example gives a service period 301 of 100 ms. The service period corresponds to the TSBTT or TIM interval of each TIM group. The service period is the available time for the radio network node 70, to serve the luminaires (wireless devices 90) in a TIM group with DL data.

Further, after pressing the light switch each of the 15 luminaires (wireless devices 90) that are connected to the light switch will have data in the DL buffer in the radio network node 70. So at the time the TIM beacon is sent out, all 15 luminaires (wireless devices 90) in the group will have pending DL data in the buffer of the radio network node 70. Serving one luminaire (wireless device 90) with the DL data by the radio network node 70, takes approximately 10 ms.

From this it is clear that only 100/10=10 luminaires (wireless devices 90), at maximum, will be served during the service period for each TIM group. Since there are 15 luminaires (wireless devices, 90) in TIM group 1, five of the luminaires (wireless devices, 90) may not be served before the service period is terminated by transmission of a consecutive TIM beacon, with a different TIM group identity. These five remaining luminaires (wireless devices, 90) in TIM group 1 therefore need to wait for the next TIM beacon comprising group identity 1, before they can be served again. In this example they need to wait another 100 ms, the service period for TIM group 2, before receiving another TIM beacon comprising TIM group identity 1. It should be noted that 10 out of the 15 luminaires were turned on within 100 ms but the remaining 5 luminaires cannot be turned on until within 300 ms.

Consequently, in the example above, only 10 out the 15 luminaires fulfilled the latency requirement of 200 ms. The remaining 5 luminaires in TIM group 1 may be served in the next service period associated TIM group 1 and hence be served within 300 ms.

In order to serve all 15 luminaires (wireless devices 90) in this example, within the latency requirement of 200 ms, the time allocation for TIM group 1 should have been longer. On the other hand, the TSBTT cannot be extended as that would impact the latency to reach the luminaires (wireless devices 90) in TIM group 2.

Thus, a dynamic extension of the duration of the service period is desired to cater for the scenarios when it is expected that there are too many wireless devices 90 in a TIM group to cope with the delay requirements.

Apart from the example given above, with the light switching use case, other use cases or scenarios, where similar problems arise, may be foreseen for e.g. when using IEEE802.11 for e.g. home- and wearable appliances capable of transmitting and/or receiving wireless traffic, e.g. to voice-, video- and/or browsing internet traffic. These types of traffic generally relate to different requirements on latency. E.g. voice traffic may have the smallest latency requirement when comparing to e.g. streaming video and/or data browsing traffic. Thereby, a need to prioritize wireless devices 90 in certain TIM groups over wireless devices 90 in other TIM groups, may arise.

The problems described above are addressed by the exemplary embodiments herein providing methods and apparatuses in terms of a radio network node 70 for scheduling of TIM beacons, wherein the scheduling is based on a traffic load of the radio network node 70 and in terms of a wireless device 90 for receiving within two consecutive full TIM beacons 101. The exemplary embodiments provided herein aims at solving the problems above by providing a dynamic extension of the service period and prioritizing wireless devices, 90, in certain TIM groups over wireless devices, 90, in other TIM groups, In the following and according to embodiments herein, there is provided a method performed by/in a radio network node 70 of a communication network 100, for scheduling TIM beacons, 101, 102.

The method is shown in FIG. 8 and comprises: determining 42 a traffic load of the radio network node 70, and scheduling, 44, based on the determined traffic load, at least a first transmission time instance 400 for a first TIM beacon (e.g. TIM beacon 101 or 102 of FIG. 1) of said TIM beacons and a second transmission time instance 400 for a second TIM beacon, e.g. TIM beacon 101 or 102 of said TIM beacons.

The method is implemented and performed by/in the radio network node 70 as described above. The actions performed by the radio network node 70 will now be described in conjunction with FIG. 8 and include:

In action 42, the radio network node 70 is configured/adapted to determine a traffic load of the radio network node 70. The traffic load may be determined based on e.g. an estimate of how many and which of the wireless devices 90 the radio network node 70 has buffered DL data for. Note however that the delay requirement of the buffered data and/or age of the buffered data and/or the service period 301 associated with the buffered data intended for a particular wireless device 90 may also be considered. The age of the buffered data may e.g. be the time the data has spent in the buffer.

In action 44, the radio network node is configured/adapted to, based on the determined traffic load, schedule a first TIM beacon at a first transmission time instance 400 and schedule a second TIM beacon at a second transmission time instance 400 such that the service period for different TIM groups are adapted to fulfill e.g. latency requirements for the traffic related to the wireless devices in the different TIM groups.

According to an embodiment, the method further comprises: associating the first TIM beacon with a first time interval 300, 301 and associating the second TIM beacon with a second time interval 300, 301. By association a TIM beacon with a time interval is meant that the TIM beacon comprises information about a time instance 400 when the consecutive TIM beacon will be transmitted thereby indicating the end of the service period 301 for the TIM beacon.

E.g in FIG. 1, the association of TIM beacon TIM2 to the time interval 301 between time instance t2 and time instance t3, may be performed by transmitting TIM2 comprising the time instance t3. Time instance 4*t*3 may be expressed in relation to the time instance t2 when TIM2 is received and may be expressed as e.g. 100 ms. The association of a time interval 300, 301 may be that the radio network node 70 determines a service period 301 and/or a TSBTT and/or TBTT 300 associated to the TIM beacons 101, 102 in order to dynamically adapt the DL capacity in the service period associated with the TIM beacon based on traffic load in the radio network node.

Figure 2:
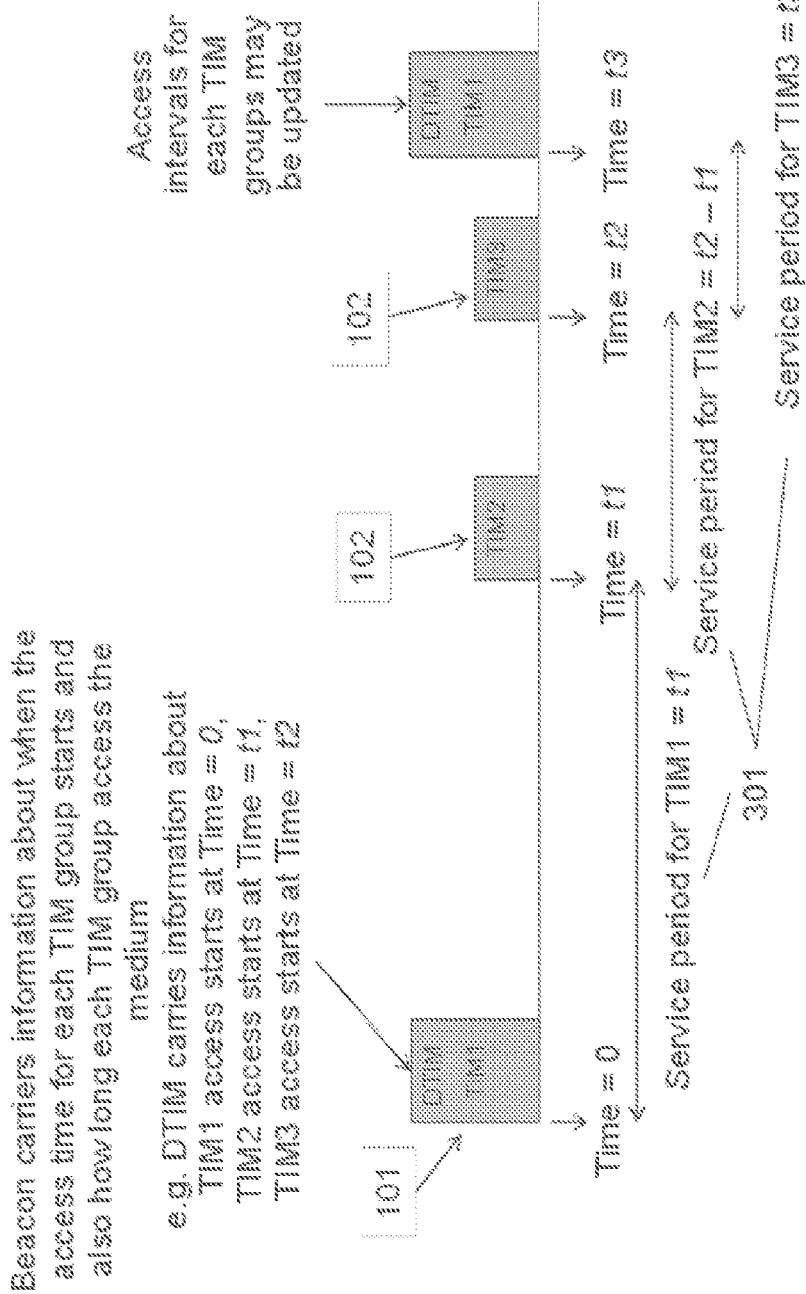
FIG. 2 illustrates an example where a TIM beacon carries information about asymmetric access time for each TIM group according to exemplary embodiments herein.

In another exemplary embodiment the first- and second time intervals are of different length. This is illustrated in FIG. 2 where e.g. the service period 301 or TSBTT for the first TIM beacon (TIM1) is longer than the service period 301 or TSBTT for the second TIM beacon (TIM2). This enables that more DL capacity may be provided to wireless devices, 90 in TIM group 1 than for TIM group 2, which may reduce latency in case the service period is adapted, based on traffic, to enable that all wireless devices in TIM group 1 can be served within the service period 1 in FIG. 2. It shall be mentioned that the scheduling of short TIM beacons within the TBTT 300 may be performed before transmitting the full TIM beacon 101 such that the TSBTT and/or service period associated with each short TIM beacon 102 are not equal in length as depicted in FIG. 2. Alternatively, one can say that the TBTT 300 interval is shared asymmetrically between the TIM groups by assigning different TSBTTs to different short TIM beacons 102. In this way, the radio network node may already at the beginning of a TBTT 300, divide the service period to match different estimated capacity needs for different TIM groups and thereby achieve the advantage of optimizing the trade-off between fulfilling latency requirements and saving battery in the wireless devices 90.

In yet another exemplary embodiment of the method described above, the first TIM beacon comprises a first group identity and the second TIM beacon comprises a second group identity. A group identity indicates a TIM group of wireless devices which will be served with DL data by the radio network node during the time interval associated with the TIM beacon comprising the group identity.

In another exemplary embodiment of the method, the second TIM beacon further comprises the first group identity.

Figure 4:
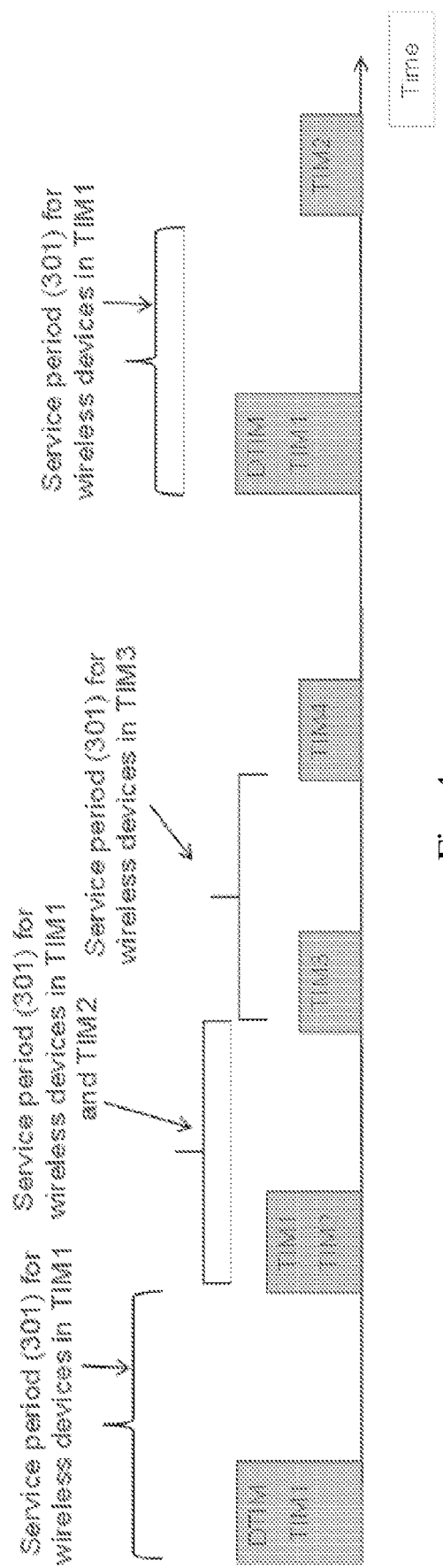
FIG. 4 illustrates a first TIM group of wireless devices which are allowed time to access the medium by sharing service period with another TIM group of wireless devices according to exemplary embodiments herein.

For example, if the wireless devices 90 belonging to the TIM group indicated by the first group identity, were not served before the second transmission time instance 400 and there is still delay critical DL data for wireless devices in the first TIM group in the DL buffer of the radio network node, the second TIM beacon may further comprise the first group identity in order to extend the service period for the first TIM group to overlap with the service period for the second TIM group and thereby reduce latency for wireless devices in the first TIM group. This scenario is illustrated in FIG. 4. To reduce battery consumption, e.g. the wireless devices belonging to the first TIM, which were not served may listen to the second TIM beacon together with the wireless devices belonging to the TIM group indicated by the second group identity.

Figure 3:
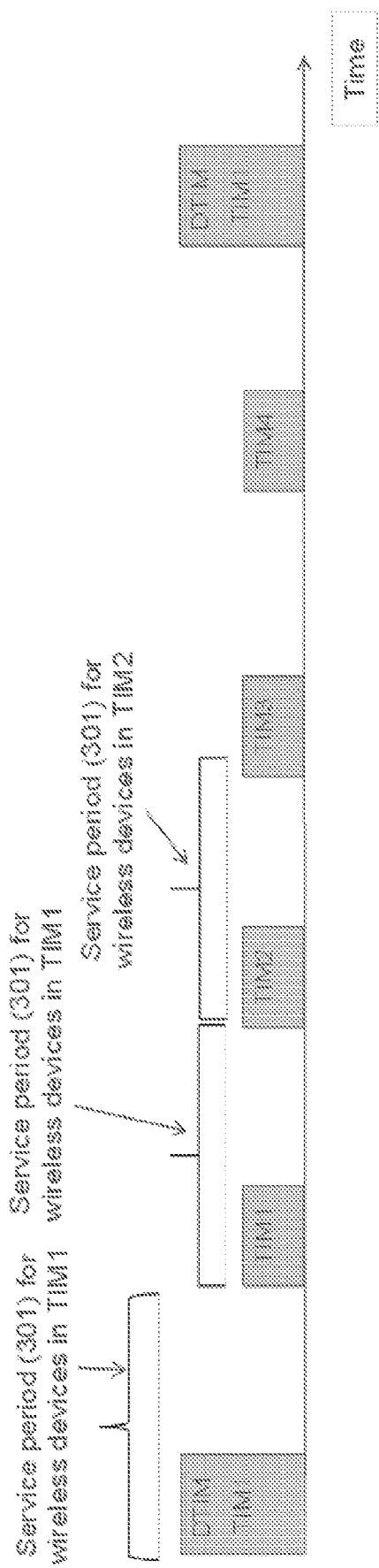
FIG. 3 illustrates an example in which the scheduling of TIM beacon prolong the service period for wireless devices in TIM1 according to exemplary embodiments herein

According to another embodiment the second group identity in the second TIM beacon is replaced by the first group identity. This embodiment is illustrated in FIG. 3. Also in this embodiment, if the wireless devices 90 belonging to the TIM group indicated by the first group identity, were not served before the second transmission time instance 400 and there is still delay critical DL data for wireless devices 90 in the first TIM group, the second TIM beacon replaces the second group identity by the first group identity in order to extend the service period for the first TIM group thereby achieving the advantage of reducing latency for wireless devices in the first TIM group. In order to achieve the advantage of reducing battery consumption of the wireless devices 90 belonging to the TIM group indicated by the second group identity, these wireless devices 90 enter power save mode and wake up to receive the consecutive TIM beacon transmitted by the radio network node 70 when the service period for the second TIM beacon ends or expires.

Figure 5:
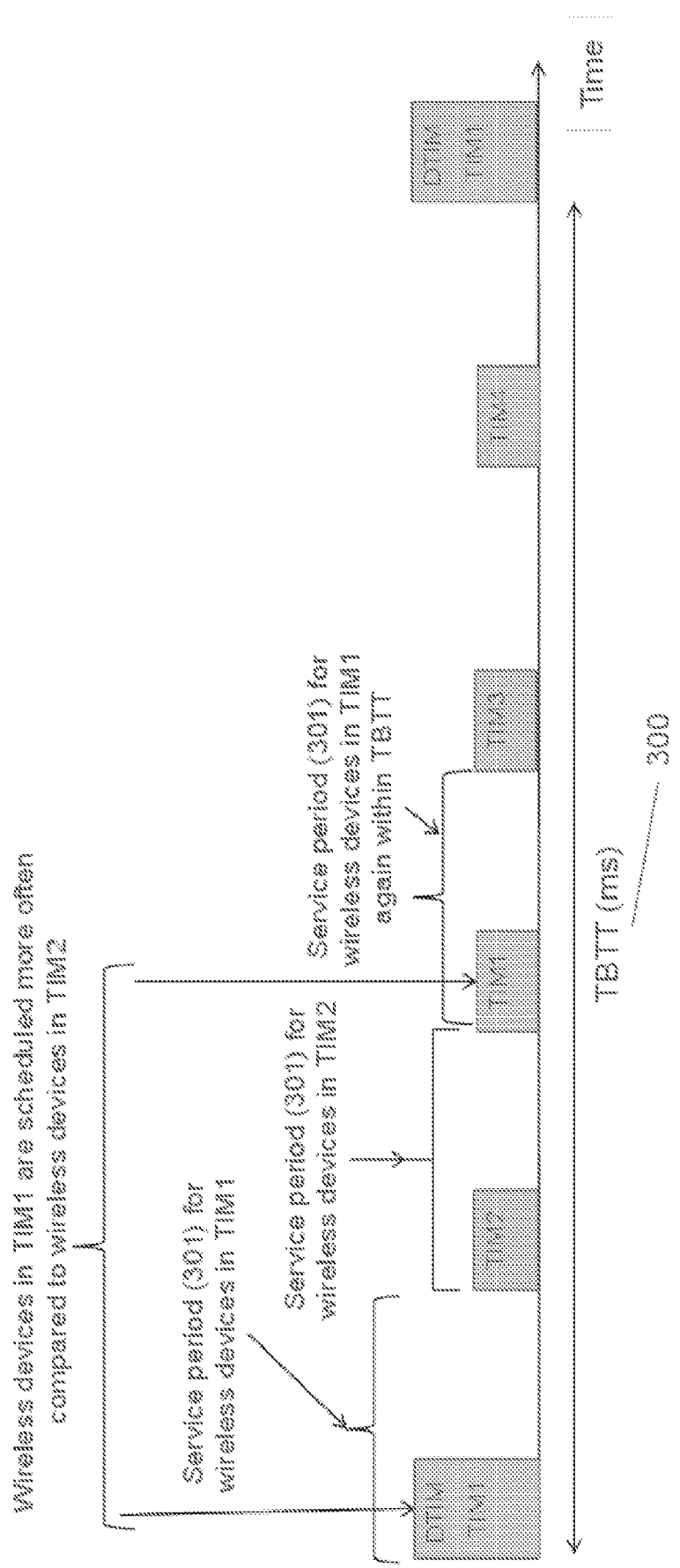
FIG. 5 illustrates a first TIM group of wireless devices, which are scheduled more often compared to a second TIM group of wireless devices according to exemplary embodiments herein.
Figure 6:
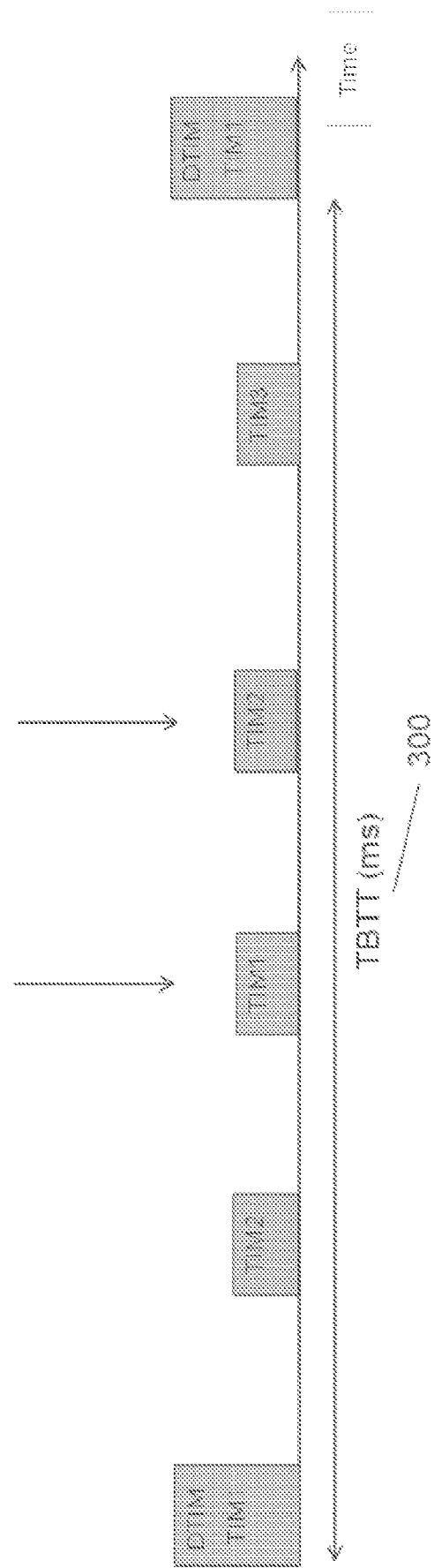
FIG. 6 illustrates TIM groups with delay sensitive traffic (e.g. voice, video) scheduled more often compared to delay tolerant traffic (e.g. background data) according to exemplary embodiments herein.

In yet another embodiment, the method further comprising transmitting a third TIM beacon after the first- and second transmission time instances 400, wherein the third TIM beacon comprising the first group identity. In this embodiment the third TIM beacon comprises the first group identity. Referring to FIG. 5, one can see that the service capacity for wireless devices 90 in TIM group 1 is higher than the service capacity for wireless devices 90 in TIM group 2. One advantage achieved by this is to enable dynamic and asymmetric service capacity allocation to the wireless devices in different TIM groups, based on the traffic load in order to fulfill e.g. latency requirements on traffic for the wireless devices in different TIM groups. It shall be mentioned that the scheduling of the TIM beacons in this embodiment may occur at the beginning of a TBTT 300, i.e. just before transmitting the full TIM beacon 101 in FIG. 5. Based on the traffic load, the radio network node 70 may schedule short TIM beacons 102 comprising the first group identity more often compared to short TIM beacons 102 comprising the second group identity as depicted in FIG. 5. It is also possible for the radio network node 90 to schedule short TIM beacons 102, at the beginning of TBTT 300, for TIM groups with strict latency requirements at the expense of short TIM beacons for TIM groups with less strict latency requirements. The wireless devices 90 may need to be informed when they should listen to the additional TIM beacons which may be solved by e.g. control signaling between the radio network node 70 and the wireless devices 90. It shall also be noted that in a scenario as described above it may be necessary for the radio network node to alter the TBTT 300 in order to e.g. transmit or send TIM beacons, with a certain group identity, more often or more frequently. In FIG. 6, an alternative scheduling of TIM Beacons, to enable dynamic and asymmetric service capacity allocation to the wireless devices in different TIM groups, is shown.

According to another exemplary embodiment, the second TIM beacon comprises a time offset indicating the transmission time instance 400 of a consecutive TIM beacon comprising the second group identity.

In this embodiment the second TIM beacon 101 or 102 may comprise a time offset, which may be expressed in milliseconds (ms). The time offset may be received and used by wireless devices 90 belonging to the second TIM group to understand that their service period is delayed with a time corresponding to the time offset and consequently they can enter sleep mode for a time corresponding to the time offset before waking up to listen to a consecutive TIM beacon comprising the second group identity. In analogy, the wireless devices belonging to the first TIM group can deduce when the consecutive TIM beacon is sent and thus understand when the service period for the first TIM group ends or expires which indicates that the wireless devices in the first TIM group may enter sleep mode to save battery.

According the above, the main steps performed by a radio network node for scheduling TIM beacons may be summarized as follows and are shown in FIG. 8:

determining 42 a traffic load of the radio network node 70 and scheduling 44, based on the determined traffic load, at least a first transmission time instance 400 for a first TIM beacon 101, 102 of said TIM beacons and a second transmission time instance for a second TIM beacon 101, 102 of said TIM beacons.

As disclosed above there are some advantages achieved by carrying out the method e.g.:

enable dynamic and asymmetric service capacity allocation to the wireless devices in different TIM groups, based on the traffic load in order to fulfill e.g. latency requirements on traffic for the wireless devices in different TIM groups.

optimizing the trade-off between fulfilling latency requirements and saving battery in the wireless devices 90.

dynamically, based on traffic load in the radio network node, adapt the service periods for different TIM groups, to facilitate the fulfillment of latency requirements without adversely affecting the battery consumption of the wireless devices 90.

According to embodiments herein, there is further proved a radio network node 70 for scheduling Traffic Indication Map beacons, TIM beacons 101, 102, the radio network node 70 comprising a processor and a memory, wherein the memory comprises instructions executable by the processor whereby the network node 70 is operative to and/or adapted to determine a traffic load of the radio network node 70 and schedule, based on the determined traffic load, at least a first transmission time instance 400 for a first TIM beacon 101, 102 of said TIM beacons and a second transmission time instance 400 for a second TIM beacon of said TIM beacons.

Details regarding features of the corresponding method embodiment have already been provided above so it is considered unnecessary to repeat such details. This goes for all embodiments related to the radio network node that will be disclosed below.

In an exemplary embodiment, the radio network node 70 is further adapted/configured to associate the first TIM beacon with a first time interval and associating the second TIM beacon with a second time interval.

In another exemplary embodiment, the radio network node 70 is disclosed, wherein the first time interval and the second time interval are of different length.

In another exemplary embodiment, the radio network node 70 is disclosed, wherein the first TIM beacon comprises a first group identity and the second TIM beacon comprises a second group identity.

In an additional exemplary embodiment, the radio network node 70 is disclosed, wherein the second TIM beacon further comprises the first group identity.

In yet another exemplary embodiment, the radio network node 70 is disclosed, wherein the second group identity in the second TIM beacon is replaced by the first group identity.

In an exemplary embodiment, the radio network node 70 is further adapted/configured to transmit a third TIM beacon after the first- and second transmission time instances 400, wherein the third TIM beacon comprises the first group identity.

In another exemplary embodiment, the radio network node 70 is disclosed, wherein the second TIM beacon comprises a time offset indicating the transmission time instance 400 of a consecutive TIM beacon comprising the second group identity.

According to embodiments herein, there is further provided, as disclosed above a radio network node 70 comprising a processor and a memory, wherein the memory comprises instructions executable by the processor whereby the network node is operative to and/or adapted to perform the main steps for scheduling TIM beacons may be summarized as follows and are shown in FIG. 8:

determine a traffic load of the radio network node 70 and schedule, based on the determined traffic load, at least a first transmission time instance 400 for a first TIM beacon 101, 102 of said TIM beacons and a second transmission time instance for a second TIM beacon 101, 102 of said TIM beacons.

As disclosed above the same advantages as previously disclosed in relation to the method performed by/in the radio network node are hereby also achieved.

In the following and according to embodiments herein, there is provided a method performed by/in a wireless device 90 in a communication network 100. The method is performed between receiving two consecutive full Traffic Indication Map beacons, full TIM beacons 101, from a radio network node 70. The method is shown in FIG. 9 and comprises: receiving 52, from a radio network node 70, a first Traffic Indication Map beacon, TIM beacon (e.g. TIM beacon 101 or 102 in FIG. 1) comprising a first group identity and a bit corresponding to a first Association Identifier, AID, transmitting 54, in response to the received first TIM beacon, a control frame 105 to the radio network node 70, indicating that the wireless device 90 is available to receive data, receiving 56, from the radio network node 70, a second TIM beacon (e.g. 102) comprising the first- or a second group identity and a bit corresponding to a second AID and transmitting 58, in response to the received second TIM beacon 102, a control frame 105 to the radio network node 70, indicating that the wireless device 90 is available to receive data.

Figure 7B:
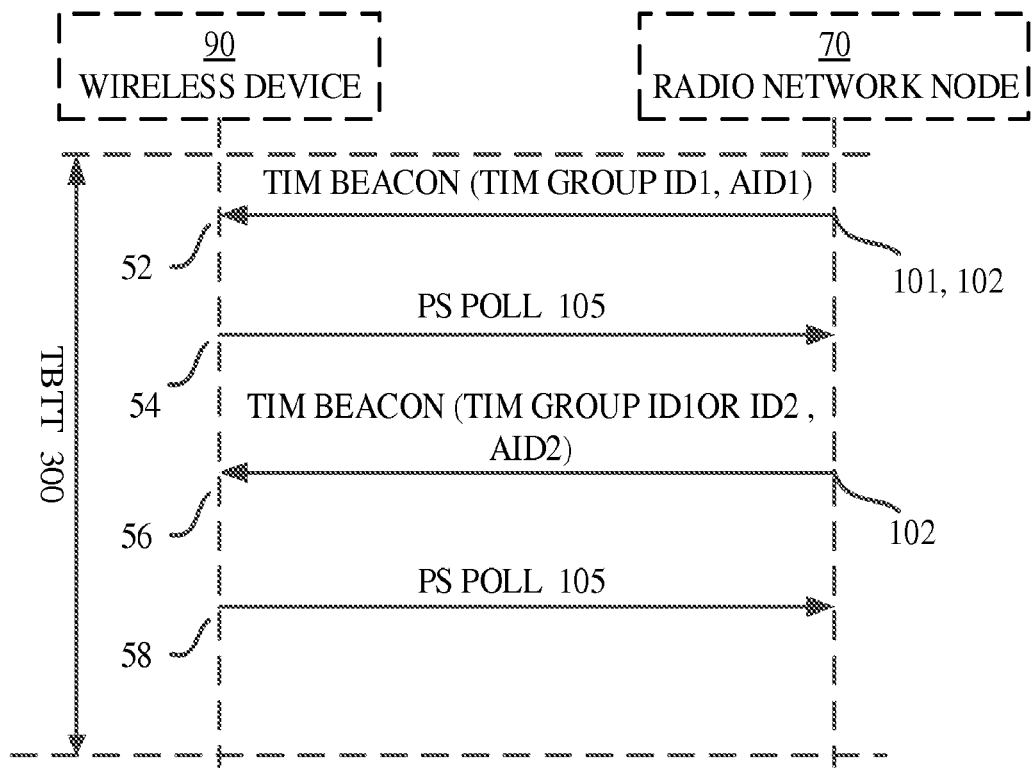
FIG. 7b illustrates, according to exemplary embodiments herein, that a wireless device responds, within TBTT 300, when detecting that a bit corresponding to its AID is set.

The method is implemented and performed by/in the wireless device 90 as described above. The actions performed by the wireless device 90 will now be described in conjunction with FIG. 9 and FIG. 7*b* and include:

In action 52, the wireless device 90 is configured/adapted to receive, from a radio network node, a first Traffic Indication Map beacon, TIM beacon (e.g. TIM beacon 101 or 102 in FIG. 1), comprising a first group identity and a bit corresponding to a first Association Identifier, AID associated with the wireless device.

In action 54, the wireless device 90 is configured/adapted to transmit, in response to the received first TIM beacon, a control frame 105 to the radio network node 70, indicating that the wireless device 90 is available to receive data.

The two steps, 52 and 54, corresponds to the wireless device 90 operating in power save mode detects that the bit corresponding to its AID is set, the wireless device 90 responds or acknowledges by transmitting, as previously described, a control frame 105 (e.g. a PS-Poll) to the radio network node 70 to indicate that it is available to receive the buffered data in the radio network node 70 as illustrated in FIG. 7*a*.

In action 56, the wireless device 90 is configured/adapted to receive, from a radio network node, a second TIM beacon 102, comprising the first- or a second group identity and a bit corresponding to a second AID. In this action the wireless device may receive a short TIM beacon comprising the second group identity, indicating that the service period for the first TIM beacon expires, but since the wireless device is also associated with the second TIM group, the wireless device detects whether the bit corresponding to its second AID is set.

In action 54, the wireless device 90 is configured/adapted to transmit, in response to the received second TIM beacon 102, a control frame 105 to the radio network node 70, indicating that the wireless device 90 is available to receive data. In case the wireless device 90 detects that the bit corresponding to its associated second AID is set, the wireless device responds or acknowledges by transmitting, as previously described, a control frame 105 (e.g. a PS-Poll) to the radio network node 70 to indicate that it is available to receive the buffered data in the radio network node 70.

The advantage of this embodiment is that the wireless device 90 is available to receive DL data from the radio network node 70 more often during the TBTT 300 and thereby improving the chances to fulfill latency requirements in case of high traffic load in the radio network node.

It shall be noted that wireless devices with delay sensitive traffic, in the above embodiment, are allocated to several TIM groups at the same time in order to have them available for DL data more often. This may mean that a single wireless device is allocated with several association identifiers (AID) in order to enable DL data transmission from the radio network node to the wireless device in each of the TIM groups the wireless device belongs to. One can imagine that the wireless device is associated with/belongs to more than two TIM groups. Then the wireless device is associated with as many AIDs as TIM groups it belongs to. One of the AIDs may be chosen as the primary AID, which may be primarily used for communication with the radio network node and the other AIDs may be denoted as secondary AIDs and used to deliver DL data in the additional TIM groups, which the wireless device is allocated to for DL latency reasons.

According to embodiments herein, there is further provided a wireless device 90 in a communication network, the wireless device 90 comprising a processor and a memory, wherein the memory comprises instructions executable by the processor whereby the wireless device is operative to and/or adapted to, between receiving two consecutive full Traffic Indication Map beacons, full TIM beacons 101; receive, from a radio network node 70, a first Traffic Indication Map beacon, TIM beacon 101, 102 comprising a first group identity and a bit corresponding to a first Association Identifier, AID; transmit, in response to the received first TIM beacon 101, 102, a control frame 105 to the radio network node 70, indicating that the wireless device 90 is available to receive data; receive, from the radio network node 70, a second TIM beacon 102 comprising the first- or a second group identity and a bit corresponding to a second AID and transmit, in response to the received second TIM beacon, a control frame 105 to the radio network node, indicating that the wireless device is available to receive data.

Details regarding features of the corresponding method embodiment have already been provided above so it is considered unnecessary to repeat such details. The advantage of the above embodiment is that the wireless device 90 is available to receive DL data from the radio network node 70 more often during the TBTT 300 and thereby improving the chances to fulfill latency requirements in case of high traffic load in the radio network node.

According to embodiments herein, there is further provided a method performed by/in a wireless device 90 in a communication network 100. The method is performed between receiving two consecutive full Traffic Indication Map beacons, full TIM beacons 101, from a radio network node 70. The method is shown in FIG. 13 and comprises: receiving 51, from a radio network node, a first short Traffic Indication Map beacon, short TIM beacon 102, comprising a first group identity and a time offset indicating the transmission time instance 400 of a second short TIM beacon 102 comprising the first group identity, and receiving 53, from a radio network node, at the transmission time instance 400 indicated by the time offset, the second short TIM beacon 102 comprising the first group identity.

The method is implemented and performed by/in the wireless device 90 as described above. The actions performed by the wireless device 90 will now be described in conjunction with FIG. 13 and include:

In action 51 the wireless device 90 is configured/adapted to receive, from a radio network node, a first short Traffic Indication Map beacon 102 comprising a first group identity and a time offset indicating the transmission time instance 400 of a second short TIM beacon 102 comprising the first group identity.

In action 53 the wireless device 90 is configured/adapted to receive, from a radio network node, at the transmission time instance 400 indicated by the time offset, the second short TIM beacon 102 comprising the first group identity.

In this embodiment the first short TIM beacon 102 may comprise a time offset, which may be expressed in milliseconds (ms). The time offset may be received by the wireless device, which belongs to a TIM group indicated by the first group identity. From the time offset, the wireless device can deduce that a second short TIM beacon, comprising the same group identity, will be transmitted by the radio network node at the time instance 400 indicated by the time offset and consequently the wireless device can enter sleep mode for a time corresponding to the time offset before waking up to listen to the second short TIM beacon comprising the first group identity. One advantage achieved by this embodiment is that the wireless device can reduce its power consumption by entering sleep mode during the time offset.

According to embodiments herein, there is further provided a wireless device 90 in a communication network, the wireless device 90 comprising a processor and a memory, wherein the memory comprises instructions executable by the processor whereby the wireless device is operative to and/or adapted to, between receiving two consecutive full Traffic Indication Map beacons, full TIM beacons 101; receive, from a radio network node, a first short Traffic Indication Map beacon, short TIM beacon 102, comprising a first group identity and a time offset indicating the transmission time instance 400 of a second short TIM beacon 102 comprising the first group identity, and receive, from the radio network node, at the transmission time instance 400 indicated by the time offset, the second short TIM beacon 102 comprising the first group identity. One advantage achieved by this embodiment is that the wireless device can reduce its power consumption by entering sleep mode during the time offset.

Details regarding features of the corresponding method embodiment have already been provided above so it is considered unnecessary to repeat such details.

According to embodiments herein, there is further proved a radio network node 70 for scheduling Traffic Indication Map beacons, TIM beacons 101, 102, the radio network node 70 comprises a determining module 76 adapted to determine a traffic load of the radio network node 70 and a scheduling module 77 adapted to schedule, based on the determined traffic load, at least a first transmission time instance 400 for a first TIM beacon 101, 102 of said TIM beacons and a second transmission time instance 400 for a second TIM beacon of said TIM beacons.

According to embodiments herein, there is further provided a wireless device 90 in a communication network, the wireless device 90 comprises a receiver module 92 adapted to receive, from a radio network node, a first Traffic Indication Map beacon, TIM beacon 101, 102 comprising a first group identity and a bit corresponding to a first Association Identifier, AID and the receiver module further adapted to receive, from the radio network node 70, a second TIM beacon 102 comprising the first- or a second group identity and a bit corresponding to a second AID and the receiver module is further adapted to receive, from a radio network node, a first short Traffic Indication Map beacon, short TIM beacon 102, comprising a first group identity and a time offset indicating the transmission time instance 400 of a second short TIM beacon 102 comprising the first group identity, and further adapted to receive, from a radio network node, at the transmission time instance 400 indicated by the time offset, the second short TIM beacon 102 comprising the first group identity. The wireless device further comprises a transmitter module 93 adapted to transmit, in response to the received first TIM beacon 101, 102, a control frame 105 to the radio network node 70, indicating that the wireless device 90 is available to receive data the transmitter module 93 is further adapted to transmit, in response to the received second TIM beacon 102, a control frame 105 to the radio network node 70, indicating that the wireless device 90 is available to receive data.

Figure 10:
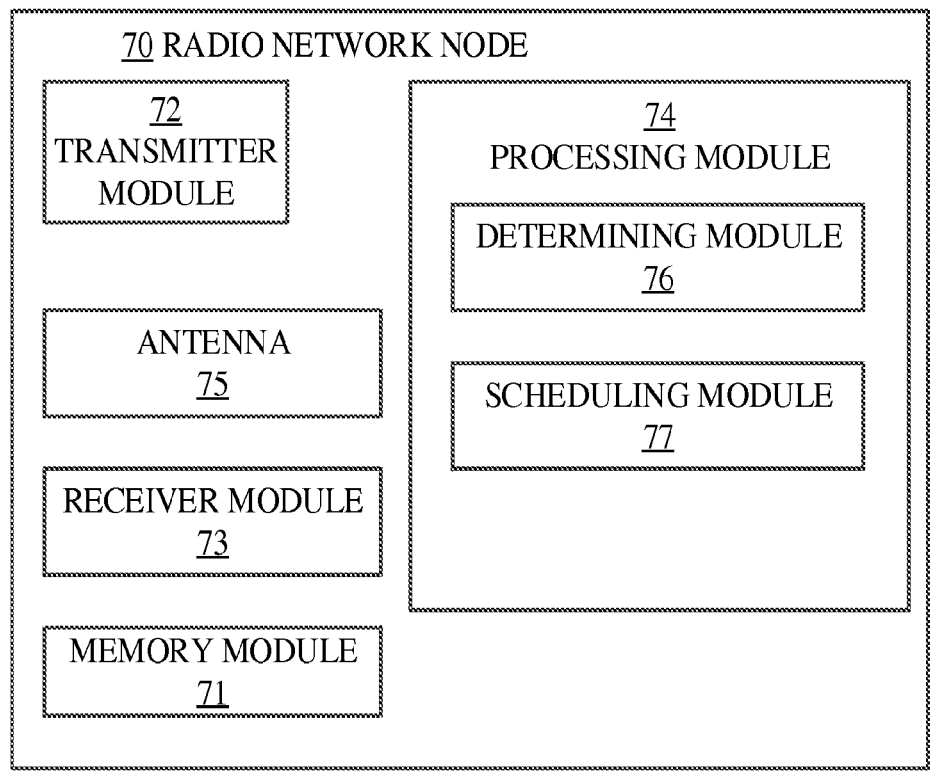
FIG. 10 is a block diagram illustrating a radio network node, according to exemplary embodiments herein.

Referring to FIG. 10 there is illustrated a block diagram of exemplary components of a radio network node 70 in accordance with previously disclosed embodiments. The radio network node 70 comprises at least a transmitter circuit or transmitter module 72; a receiver circuit or a receiver module 73; a processor 74 or a processing module or processing circuitry; a memory or memory module 71 and at least one antenna 75, Antenna 75 includes one or more antennas to transmit and/or receive radio frequency (RF) signals over the air interface. Antenna 75 may, for example, receive RF signals from transmitter circuit 72 and transmit the RF signals over the air interface to one or more wireless devices e.g. UEs or STAs and receive RF signals over the air interface from the one or more wireless devices e.g. UEs or STAs and provide the RF signals to receiver circuit 73.

Processing module/circuit 74 includes a processor, microprocessor, an application specific integrated circuit (ASIC), field programmable gate array (FPGA), or the like. Processor 74 controls the operation of the radio network node 70 and its components. Memory (circuit or module) 75 includes a random access memory (RAM), a read only memory (ROM), and/or another type of memory to store data and instructions that may be used by processor 74. The radio network node 70 may comprise additional components not shown in FIG. 10.

The memory 71 contain instructions executable by the processor 74 whereby the radio network node 70 is operative to perform the previously described method steps. There is also provided a computer program comprising computer readable code means which when run in the radio network node 70 e.g. by means of the processor 74 causes the radio network node to perform the above described method steps which include: to determine a traffic load of the radio network node and schedule, based on the determined traffic load, at least a first transmission time instance 400 for a first TIM beacon of said TIM beacons and a second transmission time instance 400 for a second TIM beacon of said TIM beacons.

As previously described, the radio network node 70 is configured to determine a traffic load of the radio network node 70. This may be done by means of the determining module 76 in the processing circuit 74. The network node 70 is further configured to schedule, based on the determined traffic load, at least a first transmission time instance 400 for a first TIM beacon (101, 102) of said TIM beacons and a second transmission time instance 400 for a second TIM beacon of said TIM beacons. The scheduling is be performed by the scheduling module 77 in the processing circuit 74.

Figure 11:
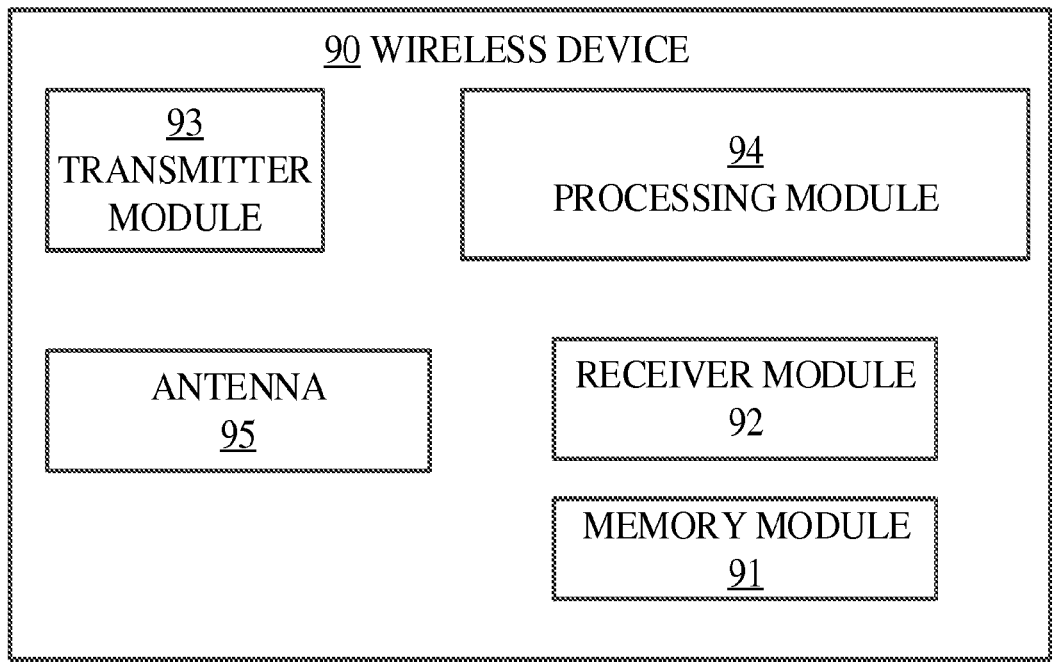
FIG. 11 is a block diagram illustrating a wireless device, according to exemplary embodiments herein.

Referring to FIG. 11 there is illustrated a block diagram of exemplary components of a wireless device 90 in accordance with previously disclosed embodiments. The wireless device 90 comprises at least a transmitter circuit or transmitter module 93; a receiver circuit or a receiver module 92; a processor 94 or a processing module or processing circuitry; a memory or memory module 91 and at least one antenna 95, Antenna 95 includes one or more antennas to transmit and/or receive radio frequency (RF) signals over the air interface. Antenna 95 may, for example, receive RF signals from transmitter circuit 93 and transmit the RF signals over the air interface to one or more radio network nodes i.e. radio base stations e.g. eNodeBs or eNBs or APs and receive RF signals over the air interface from the one or more radio base stations e.g. eNodeBs or eNBs or APs and provide the RF signals to receiver circuit 92.

Processing module/circuit 94 includes a processor, microprocessor, an application specific integrated circuit (ASIC), field programmable gate array (FPGA), or the like. Processor 94 controls the operation of the wireless device 90 and its components. Memory (circuit or module) 91 includes a random access memory (RAM), a read only memory (ROM), and/or another type of memory to store data and instructions that may be used by processor 94. The wireless device 90 may comprise additional components not shown in FIG. 11.

The memory 91 may contain instructions executable by the processor 94 whereby the wireless device 90 is operative to perform the previously described method steps. There is also provided a computer program comprising computer readable code means which when run in the wireless device 90 e.g. by means of the processor 94 causes the wireless device 90 to perform the above described method steps, which include: to receive, from a radio network node, a first Traffic Indication Map beacon, TIM beacon 101, 102 comprising a first group identity and a bit corresponding to a first Association Identifier, AID; to receive, from the radio network node 70, a second TIM beacon 102 comprising the first- or a second group identity and a bit corresponding to a second AID; to receive, from a radio network node, a first short Traffic Indication Map beacon, short TIM beacon 102, comprising a first group identity and a time offset indicating the transmission time instance 400 of a second short TIM beacon 102 comprising the first group identity; to receive, from a radio network node, at the transmission time instance 400 indicated by the time offset, the second short TIM beacon 102 comprising the first group identity; to transmit, in response to the received first TIM beacon 101, 102, a control frame 105 to the radio network node 70, indicating that the wireless device 90 is available to receive data and to transmit, in response to the received second TIM beacon 102, a control frame 105 to the radio network node 70, indicating that the wireless device 90 is available to receive data.

As previously described, the wireless device 90 is configured to receive TIM beacons and in response to reception of TIM beacons, transmit control frames. This may be done by means of the processing module 94, the receiver module 92 and the transmitter module 93.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from 3GPP and IEEE802.11EEE has been used in this disclosure to exemplify the invention, this should not be seen as limiting the scope of the invention to only the aforementioned system. Other wireless systems, including LTE or LTE-A (LTE-Advanced) and WiMax may also benefit from exploiting the ideas covered within this disclosure.

While the solution has been described with reference to specific exemplifying embodiments, the description is generally only intended to illustrate the inventive concept and should not be taken as limiting the scope of the solution. For example, the terms "radio network node", "wireless device", "mobile terminal", "STA (STAtion)", "access point", "wireless communication network" have been used throughout this disclosure, although any other corresponding entities, functions, and/or parameters could also be used having the features and characteristics described here.

With wireless device is meant a UE or a mobile station or a mobile terminal or a WiFi STA as defined by IEEE802.11, whereas with radio network node is meant a radio base station or a pico base station or a WiFi access point, also known as AP.

A TIM group is a group of wireless devices in power save mode. The wireless devices in the same TIM group may be served by a radio network node 70 in a time interval associated with a TIM beacon, which comprises the group identity indicating the TIM group.

The time reserved for a single TIM group of wireless devices 90, is called the service period 301, and may e.g. correspond to the time period between the radio network node 70, has transmitted a TIM beacon until the radio network node 70, transmits a consecutive TIM beacon.

Scheduling a TIM beacon 101, 102 by a radio network node 70, may include transmitting the TIM beacon 101, 102 at the scheduled transmission time instance 400. TBTT may be used interchangeably with TBTT interval and/or TBTT period and/or DTIM Interval and/or DTIM period.

TSBTT mat be used interchangeably with TSBTT interval and/or TSBTT period.

ABBREVIATIONS AND ACRONYMS

AC Access Category
AID Association Identifier
AP Access Point
APSD Automatic Power Save Delivery mode
DL Downlink
DTIM Delivery Traffic Indication Map
IEEE Institute of Electrical and Electronics Engineers
PS Power Save
STA Station
TBTT Target Beacon Transmission Time
TIM Traffic Indication Map
TSBTT Target Short Beacon Transmission Time
WLAN Wireless Local Area Network

The invention claimed is:

1. A method for scheduling Traffic Indication Map (TIM) beacons in a radio network node of a communication network, the method comprising:
   determining, by the radio network node, a traffic load of the radio network node; and
   scheduling by the radio network node, based on the determined traffic load, at least a first transmission time instance for a first TIM beacon and a second transmission time instance for a second TIM beacon, wherein the first TIM beacon comprises a first group identity, wherein the second TIM beacon comprises a second group identity and the first group identity, and wherein the second TIM beacon further comprises a time offset indicating a transmission time instance of a consecutive TIM beacon comprising the second group identity.

2. The method according to claim 1, further comprising associating the first TIM beacon with a first time interval and associating the second TIM beacon with a second time interval.

3. The method according to claim 2, wherein the first time interval and the second time interval are of different length.

4. The method according to claim 1, wherein the second group identity in the second TIM beacon is replaced by the first group identity.

5. The method according to claim 1, further comprising transmitting a third TIM beacon after the first and second transmission time instances, wherein the third TIM beacon comprises the first group identity, wherein the first transmission time instance indicates a time instance for transmitting the first TIM beacon, and the second transmission time instance indicates a time instance for transmitting the second TIM beacon.

6. A method performed by a wireless device in a communication network, wherein the method is performed between receiving two consecutive full Traffic Indication Map (TIM) beacons, the method comprising:

receiving, from a radio network node, a first short TIM beacon comprising a first group identity and a time offset indicating a transmission time instance of a second short TIM beacon comprising the first group identity; and receiving, from the radio network node, at the transmission time instance indicated by the time offset, the second short TIM beacon comprising the first group identity, wherein the second short TIM beacon further comprises a time offset indicating a transmission time instance of a consecutive short TIM beacon comprising a second group identity.

7. A radio network node configured for scheduling Traffic Indication Map (TIM) beacons, the radio network node comprising:

a processor; and a memory, wherein the memory comprises instructions executable by the processor whereby the radio network node is operative to:

determine a traffic load of the radio network node; and schedule, based on the determined traffic load, at least a first transmission time instance for a first TIM beacon and a second transmission time instance for a second TIM beacon, wherein the first TIM beacon comprises a first group identity, wherein the second TIM beacon comprises a second group identity and the first group identity, and wherein the second TIM beacon further comprises a time offset indicating a transmission time instance of a consecutive TIM beacon comprising the second group identity.

8. The radio network node according to claim 7, wherein the radio network node is further operative to associate the first TIM beacon with a first time interval and associate the second TIM beacon with a second time interval.

9. The radio network node according to claim 8, wherein the first time interval and the second time interval are of different length.

10. The radio network node according to claim 7, wherein the second group identity in the second TIM beacon is replaced by the first group identity.

11. The radio network node according to claim 7, wherein the radio network node is further operative to transmit a third TIM beacon after the first and second transmission time instances, wherein the third TIM beacon comprises the first group identity, and wherein the first transmission time instance indicates a time instance for transmission of the first TIM beacon, and the second transmission time instance indicates a time instance for transmission of the second TIM beacon.

12. A wireless device, comprising:

a processor; and a memory, wherein the memory comprises instructions executable by the processor whereby the wireless device is operative to, between reception of two consecutive full Traffic Indication Map (TIM) beacons:

receive, from a radio network node, a first short TIM beacon, comprising a first group identity and a time offset indicating a transmission time instance of a second short TIM beacon comprising the first group identity; and receive, from the radio network node, at the transmission time instance indicated by the time offset, the second short TIM beacon comprising the first group identity, wherein the second short TIM beacon further comprises a time offset indicating a transmission time instance of a consecutive short TIM beacon comprising a second group identity.

* * * * *